(12) United States Patent
Zhang et al.

(10) Patent No.: US 12,288,149 B1
(45) Date of Patent: Apr. 29, 2025

(54) SYSTEM AND METHOD FOR THE PREDICTION OF RUNWAY CONFIGURATION AND AIRPORT ACCEPTANCE RATE (AAR) FOR MULTI-AIRPORT SYSTEM

(71) Applicant: University of South Florida, Tampa, FL (US)

(72) Inventors: Yu Zhang, Tampa, FL (US); Yuan Wang, San Jose, CA (US)

(73) Assignee: University of South Florida, Tampa, FL (US)

( * ) Notice: Subject to any disclaimer, the term of this patent is extended or adjusted under 35 U.S.C. 154(b) by 1023 days.

(21) Appl. No.: 17/146,528

(22) Filed: Jan. 12, 2021

Related U.S. Application Data

(60) Provisional application No. 63/053,787, filed on Jul. 20, 2020.

(51) Int. Cl.
*G06N 3/045* (2023.01)
*G06N 3/08* (2023.01)
*G08G 5/56* (2025.01)

(52) U.S. Cl.
CPC ............... *G06N 3/045* (2023.01); *G06N 3/08* (2013.01); *G08G 5/56* (2025.01)

(58) Field of Classification Search
CPC ........ G06N 3/045; G06N 3/08; G08G 5/0043; G08G 5/56
See application file for complete search history.

(56) References Cited

U.S. PATENT DOCUMENTS

| 6,950,037 B1 | 9/2005 | Clavier et al. |
| 9,076,327 B1 | 7/2015 | Baiada et al. |
| 2002/0002548 A1 | 1/2002 | Roundtree |
| 2024/0046104 A1* | 2/2024 | Tokui ............... G06F 8/311 |

OTHER PUBLICATIONS

Murca et al., "Predicting and planning airport acceptance rates in metroplex", Nov. 6, 2018, Transportation Research Part C 97, pp. 301-323. (Year: 2018).*

(Continued)

*Primary Examiner* — Brent Johnston Hoover
(74) *Attorney, Agent, or Firm* — Molly L. Sauter; Smith & Hopen, P.A.

(57) ABSTRACT

Numerical weather prediction data during a time period of interest for a multi-airport system is used to generate a three-dimensional (3-D) tensor data for the time period of interest. The 3-D tensor data is then used to predict hourly runway configurations for each of a plurality of airports of the multi-airport system during the time period of interest using the 3-D tensor data as input to a plurality of runway configuration convolutional neural networks (CNN) branches and to predict an AAR for each of the plurality of airports of the multi-airport system during the time period of interest using the 3-D tensor data as input to an airport acceptance rate (AAR) CNN branch. The predicted hourly runway configuration for each of the plurality of airports and the predicted AAR for each of the plurality of airports are then used to manage flights within the multi-airport system.

19 Claims, 3 Drawing Sheets

(56) References Cited

OTHER PUBLICATIONS

Cox et al., "Probabilistic Airport Acceptance Rate Prediction", Jan. 8, 2016, AIAA Modeling and Simulation Technologies Conference, pp. 1-9. (Year: 2016).*

Avery, J. et al., "Predicting Airport Runway Configuration: A Discrete-Choice Modeling Approach" Eleventh USA/ Europe Air Traffic Management Research and Development Seminar, Lisbon, Portugal Jun. 23-26, 2015.

Ahmed, M. S. et al., "A Multi-Layer Artificial Neural Network Approach for Runway Configuration Prediction" In Proceedings of the 8th International Conference on Research in Air Transportation (ICRAT 2018), Castelldefels, Spain. URL: http://icrat.org/ICRAT/seminarContent/2018/papers/ICRAT_2018_paper_43.pdf.

Bertsimas, D. et al. "Optimal Selection of Airport Runway Configurations" Operations Research, vol. 59, No. 6, Nov.-Dec. 2011, pp. 1407-1419.

* cited by examiner

SYSTEM AND METHOD FOR THE PREDICTION OF RUNWAY CONFIGURATION AND AIRPORT ACCEPTANCE RATE (AAR) FOR MULTI-AIRPORT SYSTEM

CROSS-REFERENCE TO RELATED APPLICATIONS

This application claims priority to currently U.S. Provisional Patent Application No. 63/053,787 filed by the same inventors on Jul. 20, 2020 and entitled, "Prediction of Runway Configuration and Airport Acceptance Rate (AAR) for Multi-Airport System", the entirety of which is incorporated herein by reference.

BACKGROUND OF THE INVENTION

Automated prediction of real-time runway configuration and airport capacity, i.e., airport acceptance rates (AARs), is critical for the future generation of air traffic management. In the future aviation industry, multi-sourced weather forecast information will be available for air traffic decision making units and the knowledge to use this weather forecast information efficiently is key for overall efficiency of air traffic management.

In the U.S., 70% of the air traffic is served by 21 multi-airport systems (MASs). In a multi-airport system, the task of selecting runway configurations and setting appropriate AARs is challenging for two reasons. First, they both heavily depend on weather forecasts in a large-scale terminal area, so spatial features of weather forecasts should not be ignored. Second, operational interdependency among airports in a MAS makes accurate prediction of runway configurations and AARs mathematically difficult to formulate and much more complex to solve. Under current operational protocol, runway configurations and AARs of a MAS are determined by the coordination of different entities, which requires intensive verbal communications. Also, air traffic control personnel lack sufficient tools to assist them in translating weather forecast information into real-time runway configuration and AARs. Thus, a decision-making tool that can predict runway configuration and AARs in real-time for a metroplex is an urgent need. However, in view of the art considered as a whole at the time the present invention was made, it was not obvious to those of ordinary skill in the art how the limitations of the art could be overcome.

SUMMARY OF THE INVENTION

In various embodiments, the present invention provides a system and method for an end-to-end data-driven Deep Learning framework for predicting both runway configurations and AARs, simultaneously, to support efficient air traffic management for complex multi-airport systems. The method includes automatic data retrieving and processing in addition to modeling and prediction. There are at least two major contributions of the present invention to the current state of the art. First, the proposed method uses ensembled gridded weather forecasts for the terminal airspace, instead of an isolated station-based terminal weather forecast. Second, the method captures the operational interdependency aspects inherent in the parameter learning process so that the proposed modeling framework can predict both runway configuration and AARs, simultaneously and with high accuracy. No such framework serving MAS is currently known in the art.

In a particular embodiment, the present invention provides a computer-implemented method for simultaneously predicting runway configurations and airport acceptance rates (AARs) for a multi-airport system. The method includes, obtaining numerical weather prediction data during a time period of interest for a multi-airport system and generating three-dimensional (3-D) tensor data from the numerical weather prediction data for the time period of interest. The method further includes, predicting hourly runway configurations for each of a plurality of airports of the multi-airport system during the time period of interest using the 3-D tensor data as input to a plurality of runway configuration convolutional neural networks (CNN) branches, predicting an AAR for each of the plurality of airports of the multi-airport system during the time period of interest using the 3-D tensor data as input to an airport acceptance rate (AAR) CNN branch and using the predicted hourly runway configuration for each of the plurality of airports and the predicted AAR for each of the plurality of airports to manage flights within the multi-airport system.

In a particular embodiment the numerical weather prediction data is Rapid Refresh (RAP) data.

In an additional embodiment, the present invention provides a system, including a processor, memory, display and input device for managing flights within a multi-airport system simultaneously by predicting runway configurations and airport acceptance rates (AARs) for a multi-airport system. The system includes, an input device for obtaining Rapid Refresh (RAP) during a time period of interest for a multi-airport system, wherein the multi-airport system is within a grid of interest and a processor for generating three-dimensional (3-D) tensor data from the RAP data for the time period of interest, wherein the 3-D tensor data comprises latitude, longitude, and weather-forecast elements for the grid of interest, for predicting hourly runway configurations for each of a plurality of airports of the multi-airport system during the time period of interest using the 3-D tensor data as input to a plurality of runway configuration convolutional neural networks (CNN) branches and for predicting an AAR for each of the plurality of airports of the multi-airport system during the time period of interest using the 3-D tensor data as input to an airport acceptance rate (AAR) CNN branch. The system further includes a display or output device to provide the predicted hourly runway configuration for each of the plurality of airports and the predicted AAR for each of the plurality of airports to allow a user of the system to manage flights within the multi-airport system.

In another embodiment, the present invention provides one or more non-transitory computer-readable media having computer-executable instructions for performing a method of running a software program on a computing device, the computing device operating under an operating system, the method including issuing instructions from the software program for simultaneously predicting runway configurations and airport acceptance rates (AARs) for a multi-airport system comprising. The issued instructions including, obtaining numerical weather prediction data during a time period of interest for a multi-airport system and generating three-dimensional (3-D) tensor data from the numerical weather prediction data for the time period of interest. The issued instructions further including, predicting hourly runway configurations for each of a plurality of airports of the multi-airport system during the time period of interest using the 3-D tensor data as input to a plurality of runway configuration convolutional neural networks (CNN) branches, predicting an AAR for each of the plurality of airports of the multi-airport system during the time period of interest using the 3-D tensor data as input to an airport acceptance rate (AAR) CNN branch and using the predicted hourly runway configuration for each of the plurality of airports and the predicted AAR for each of the plurality of airports to manage flights within the multi-airport system.

As such, in various embodiments, the present invention provides an improved system and method for simultaneously predicting runway configurations and AARs for a multi-airport system.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE INVENTION

Figure 1:
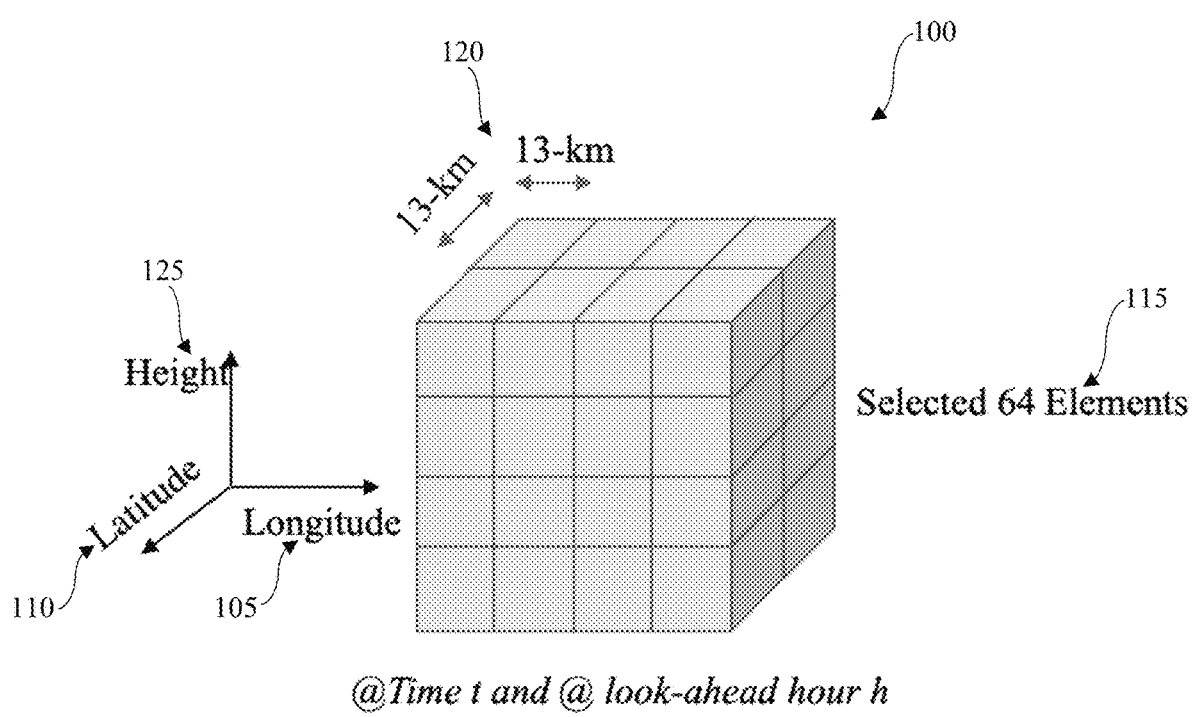
FIG. 1 is a diagram illustrating processed Rapid Refresh (RAP) data, as is known in the art.

The number of air passengers has been steadily increasing in past decades, with the average annual rate in the U.S. reaching 4.4% in the past five years (2014-2018). However, on average, only 77.95% of airline flights have been on-time in those five years. According to the Bureau of Transportation Statistics in 2018, 19.95% of flights encountered delays and 2.2% were canceled. Of the delayed flights, 55% were caused by inclement weather conditions and 36% by heavy traffic volume.

Runways are bottlenecks of National Airspace Systems (NAS), and the situation becomes worse when adverse weather effects airfield capacity. To alleviate congestion, either the physical airfield capacity needs to be enhanced or air traffic management (ATM) initiatives are needed to improve the utilization of existing capacity. Increasing airport capacity through constructing new runways, taxiways, or terminal buildings requires massive capital investment and rigorous feasibility studies, which can take up to or more than 10 years, and sometimes can be strongly opposed by local communities, due to environmental concerns. Comparably, ATM initiatives to improve operations could be a timely and effective solution.

The U.S. Federal Aviation Administration (FAA) and the National Aeronautics and Space Administration (NASA) have been working on airfield-related ATM initiatives such as an integrated arrival, departure, and surface tool as a traffic management system for complex terminal environments. These initiatives are expected to improve the utilization of the airfield capacity. However, airfield capacity, especially real-time airfield capacity prediction, is key to successful implementation of these initiatives. As elaborated in a review of the literature, extensive efforts have been made for developing methods to predict real-time airfield capacities. The performance of prediction methods, however, still need improvement. Also, the airfield capacity of airports in a multi-airport system (MAS), where airports share a same metroplex, and airport operations that can interfere with each other due to the sharing of airspace, has not been well studied yet.

Airport capacity is usually defined as maximum sustainable throughput, i.e., the number of aircraft operations an airport can accommodate, under continuous demand, for a certain period of time. Depending upon the purpose, methods for defining airport capacity can be quite different. For example, for planning purposes, the airport capacity tool runwaySimulator sponsored by FAA and developed by Metron, is widely used. For evaluating large capital expenditures, users may choose simulation software and perform a more sophisticated what-if analysis to determine airport capacity by considering different runway layouts and operations. Airport capacity obtained from these approaches is referred to as theoretical airport capacity. For air traffic management initiatives to improve the use of airfield capacity, however, real-time suitable runway configuration and airfield capacity are needed, which are dynamically predicted given forecasted weather conditions, air traffic control staffing, and other operational environment features. Among these factors, forecasted weather is a major influential factor, and the combined prediction of runway configuration and airfield capacity is a challenging problem.

To complicate things even further, in areas where multiple airports are present, operational interdependency among airports makes prediction mathematically difficult to formulate and much more complex to ensure the accuracy. These areas, called metroplexes (with multi-airport systems), are composed of two or more major airports that usually serve the air traffic of a metropolitan area and have coordinated operations. For other non-metropolitan areas, they may also have multi-airport systems where some airports act as reliever airports in case of congestion or reduced capacity at other airport(s). Airports in a multi-airport system need to have synchronized operations to effectively use the limited terminal airspace, especially when capacity is constrained by inclement weather conditions or other factors. These airports usually share only one Terminal Radar Approach Control (TRACON) facility. For example, three major airports in New York are in TRACON N90. Under the current systems, air traffic control personnel at each airport select a runway configuration, whereas air traffic managers/planners in the TRACON determine airport acceptance rates (AARs) for these airports for the next, or several, hours based on various sources of weather forecast and airport conditions (e.g., runway closure). Accurate prediction of AARs is key to enabling efficient air traffic flow management. Underestimating AARs could cause unnecessary ground delays and underuse of airport/airspace resources. Alternatively, overestimating AARs could increase airborne delays where aircraft must be held or even diverted until receiving confirmation of entering terminal airspace for safe landing. AARs are highly related to a selected runway configuration. Thus, it is important to predict both runway configuration and AARs, simultaneously.

In MASs, the task of selecting runway configurations and setting appropriate AARs is challenging because both are heavily dependent on weather forecasts in a large-scale terminal area. Currently, air traffic control personnel lack sufficient tools to assist them in translating weather forecast information from multiple sources into real-time runway configurations and AARs. In addition, under current operational protocol, runway configurations and AARs are determined by the coordination of different entities, which requires intensive verbal communications. Thus, an automated decision-making tool that can predict runway configuration and AARs in real-time for a metroplex is an urgent need.

Weather is a critical component for determining runway configuration and airport capacity. Currently available weather forecast products are fragmented. One important NextGen program is to integrate weather information and translate weather conditions so that they could be used for developing decision support tools for air traffic management.

Rapid Refresh (RAP) is a numerical weather model that covers the continental U.S. (CONUS) domain and is run by the National Centers for Environmental Prediction (NCEP). A previous version of RAP was called Rapid Update Cycle (RUC). RAP data is the continental-scale numerical weather forecast data disseminated and maintained by NOAA and has been used by numerous entities to obtain accurate short-term weather forecast information. RAP data provides severe weather and hazard information together with other general weather condition elements aloft and on the surface.

Currently, RAP has two versions regarding weather data resolutions. The first generates weather forecast on a 13-km (8-mi) resolution horizontal grid, and the second, called the High-Resolution Rapid Refresh (HRRR), generates data on a 3-km (2-mi) resolution grid (not archived by NOAA). RAP forecasts are generated and disseminated every hour with a forecast horizon from the current hour to up to 23 hrs. Radar data, surface observations, and satellite data are the sources used for the generation of RAP forecasts. In particular, RAP data with 13-km resolution may be used, as archived by the NOAA National Center for Environmental Information.

RAP weather forecasts are processed and archived in gridded binary format (.grib2 file). In the RAP 13-km resolution version, each grid has location information represented by latitude and longitude and 315 weather forecast elements/variables distributed in multiple vertical layers—for example, surface precipitation and 255-0 mb above ground pressure. 64 weather forecast elements that have impact on the real-time airport capacity and runway selections are carefully selected based on previous studies.

The RAP weather forecast is ensembled gridded data and is different from a station-based aviation weather forecast, where a single point represents the regional weather condition. To use the spatial feature, the RAP data is decoded and reshaped from the Gridded binary format to three-dimensional tensor data 100, as illustrated in FIG. 1. Each 13 km×13 km 120 grid is represented by one corresponding latitude 110 and longitude 105. The height dimension 125 indicates different layers that contain different weather forecast elements 115—a total of 64 in the sample illustration. Note that the height 125 does not represent altitude; rather, it represents layers defined in RAP, such as surface, 90 millibar above ground, etc.

In various embodiments, the method of the present invention includes a python-based toolbox to automatically download RAP weather forecast data from the NOAA server, then automatically decode, process and crop the data for a target MAS region. The outcome of this toolbox can then be directly used in the framework described below.

A Convolutional Neural Network (CNN) is a class of Deep Neural Network (DNN) that is applied widely in image learning and video processing. Different from DNN, which takes vectors as inputs, the inputs of CNN are 3-D tensors, where the first two dimensions are horizontal and vertical positions and the third is the features, or channels. For image classification and schematic analysis, the horizontal and vertical positions are the location of a certain pixel, and the features are usually RGB values that comprise the one pixel. In the present invention, the inputs are also 3-D tensors 100, wherein the positions are latitude 110 and longitude 105 of a certain grid, and features 115 are weather forecast elements in each grid 100.

The core technique of a CNN layer is using a 3-D matrix called a kernel, taking the dot product of the kernel and the extracted windows of the same size from the input tensor and applying a non-linear activation function to obtain a feature map that contains various representations of the input tensor. Each kernel is set to an initial weight, and the weight is updated after each learning iteration during the training process using a stochastic gradient decent algorithm. In this way, the model can handle complex non-linear spatial problems in which the network can learn to transform the input into the most representative features that can be used for classification and regression.

The input of the method framework is the selected 64 RAP weather-forecast elements, which include 24 surface variables and 20 aloft variables, as shown in Table 1. Among the 64 elements, 4 are categorical variables and 60 are numerical variables. The numerical variables selected are on a wide range of scales. Input and output variables that have large scale discrepancies can make the optimization process difficult because of the large gradient during CNN training. Thus, a maximin normalization method was applied to scale all input weather elements into [0, 1], following the function $$X_{norm} = \frac{X - X_{min}}{X_{max} - X_{min}},$$

where $X_{norm}$ is the normalized vector of input variable, X is the original vector of input elements, and $X_{min}$ and $X_{max}$ are the minimal and maximum vector of input features, respectively.

TABLE 1

Selected weather elements from RAP

| Layer | Acronym | Description | Unit |
| --- | --- | --- | --- |
| 1000 m above ground | REFD | Derived radar reflectivity | dbZ |
| 1000 m above ground | HLCY | Storm relative helicity | m2/s2 |
| 180-0 mb above ground | 4LFTX | Best (4-layer) lifted index | K |
| 180-0 mb above ground | CAPE | Convective Available Potential Energy | J/kg |
| 180-0 mb above ground | CIN | Convective inhibition | J/kg |
| 2 m above ground | DEPR | Dew point depression (or deficit) | K |

TABLE 1-continued

Selected weather elements from RAP

| Layer | Acronym | Description | Unit |
|---|---|---|---|
| 2 m above ground | DPT | Dew point temperature | K |
| 2 m above ground | POT | Potential temperature | K |
| 2 m above ground | RH | Relative humidity | % |
| 2 m above ground | SPFH | Specific humidity | kg/kg |
| 2 m above ground | TMP | Temperature | K |
| 255-0 mb above ground | CAPE | Convective Available Potential Energy | J/kg |
| 255-0 mb above ground | CIN | Convective inhibition | J/kg |
| 255-0 mb above ground | PLPL | Pressure of level from which parcel was lifted | Pa |
| 3000-0 m above ground | HLCY | Storm relative helicity | m2/s2 |
| 4000 m above ground | REFD | Derived radar reflectivity | dbZ |
| 500 mb | ABSV | Absolute vorticity | /s |
| 500 mb | HGT | Geopotential height | gpm |
| 500 mb | RH | Relative humidity | % |
| 500 mb | TMP | Temperature | K |
| 500 mb | UGRD | u-component of wind | m/s |
| 500 mb | VGRD | v-component of wind | m/s |
| 500 mb | VVEL | Vertical velocity (pressure) | Pa/s |
| 500-1000 mb | LFTX | Surface lifted index | K |
| 6000-0 m above ground | USTM | u-component of storm motion | m/s |
| 6000-0 m above ground | VSTM | v-component of storm motion | m/s |
| 6000-0 m above ground | VUCSH | Vertical u-component shear | /s |
| 6000-0 m above ground | VVCSH | Vertical v-component shear | /s |
| 90-0 mb above ground | CAPE | Convective Available Potential Energy | J/kg |
| 90-0 mb above ground | CIN | Convective inhibition | J/kg |
| Convective cloud top level | HGT | Geopotential height | gpm |
| Entire atmosphere | PWAT | Precipitable water | kg/m2 |
| Entire atmosphere | REFC | Maximum/Composite radar reflectivity | |
| Entire atmosphere | RETOP | Radar Echo Top (18.3 DBZ) | m |
| Entire atmosphere | RHPW | Relative humidity with respect to precipitable water | % |
| Entire atmosphere | TCDC | Total cloud cover | % |
| Equilibrium level | HGT | Geopotential height | gpm |
| High cloud layer | HCDC | High cloud cover | % |
| Low cloud layer | LCDC | Low cloud cover | % |
| Middle cloud layer | MCDC | Medium cloud cover | % |
| Surface | ACPCP | Convective precipitation | kg/m2 |
| Surface | BGRUN | Subsurface runoff (baseflow) | kg/m2 |
| Surface | CAPE | Convective Available Potential Energy | J/kg |
| Surface | CFRZR | Categorical freezing rain (yes = 1; no = 0) | non-dim |
| Surface | CICEP | Categorical ice pellets (yes = 1; no = 0) | non-dim |
| Surface | CIN | Convective inhibition | J/kg |
| Surface | CRAIN | Categorical rain (yes = 1; no = 0) | non-dim |
| Surface | CSNOW | Categorical snow (yes = 1; no = 0) | non-dim |
| Surface | EPOT | Potential temperature | K |
| Surface | GUST | Surface wind gust | m/s |
| Surface | HGT | Geopotential height | gpm |
| Surface | HINDEX | Haines Index (dryness) | |
| Surface | HPBL | Planetary boundary layer height | m |
| Surface | LTNG | Lightning | non-dim |
| Surface | MSTAV | Moisture availability | % |
| Surface | NCPCP | Large scale precipitation (non-conv.) | kg/m2 |
| Surface | PRATE | Precipitation rate | kg/m2/s |
| Surface | PRES | Pressure | Pa |
| Surface | PTEND | Pressure tendency | Pa/s |
| Surface | SNOD | Snow depth | m |
| Surface | SSRUN | Storm surface runoff | kg/m2 |
| Surface | TMP | Temperature | K |
| Surface | VIS | Visibility | m |

Figure 2:
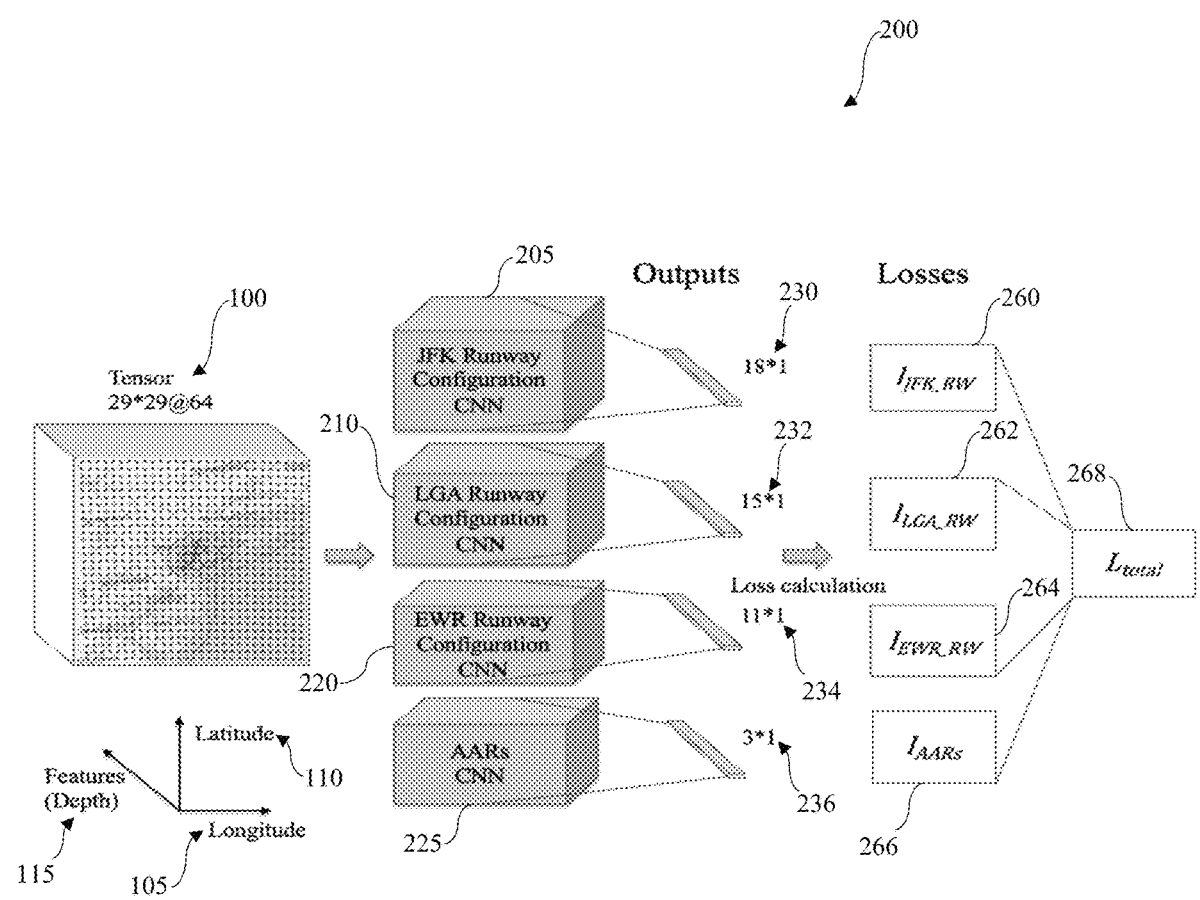
FIG. 2 is an illustration of a proposed multi-airport system Runway Airport Acceptance Rate (RWAAR) modeling framework, in accordance with an embodiment of the present invention.

The overall modeling framework 200 is shown in FIG. 2. The model includes four multi-layer CNNs 205, 210, 220, 225 that take in the same input tensor 100 and then feed into different multi-layer CNN models for different training purposes. The top three CNN branches 205, 210, 220 shown in FIG. 2 have the same model architecture (see FIG. 3) and are used for predicting hourly runway configurations for each airport. The fourth CNN branch 225 is used for predicting AARs of the three airports (see FIG. 3 for model architecture). The overall model input is a 3-D tensor 100 with a size of 29×29×64, where 64 is the normalized weather elements produced from processed RAP gridded data and the outputs are airport runway configurations and AARs within the study multi-airport system. The output 230, 232, 234 of each respective runway configuration CNN branch 205, 210, 220 is an n×1 vector, where n is the number of runway configuration categories (classes) for that airport. The outputs 236 of AAR CNN branch 225 are AAR values for each airport.

Prediction of runway configurations is a classification problem and prediction of AARs is a regression problem; thus, two types of functions were used to calculate the loss for each model branch. In the exemplary runway configuration CNN branch 205 shown in FIG. 3, softmax $$\frac{\exp(y_i)}{\sum_j y_j}$$

was applied to compute the probability that the training sample i belongs to class j. Then cross entropy $$-\sum_i^K y_i \log(\hat{y}_i)$$

was used to calculate overall model loss, where $y_i$ is $i^{th}$ element of target vector, $\hat{y}_i$ is $i^{th}$ element of probability obtained from softmax function, and K is the number of classes (also the length of output vector, in this case the class of runway configurations). In the AAR CNN branch 225 illustrated in FIG. 4, the loss function used is the root mean square error $$\sqrt{\frac{\sum_{i=1}^n = (\hat{y}_i - y_i)^2}{n}},$$

where $y_i$ is the $i^{th}$ element of the true AAR value and $\hat{y}_i$ is the $i^{th}$ element of the predicted value of AARs in a batch. The following weighted loss was used to calculate the total loss 268 of the whole RWAAR (Runway Airport Acceptance Rate) net using function:

$$L_{Total} = W_{JFK\_RW}l_{JFK\_RW} + W_{LGA\_RW}l_{LGA\_RW} + W_{EWR\_RW}l_{EWR\_RW} + W_{AARs}l_{AARs}$$

where $l_{JFK\_RW}$, $l_{LGA\_RW}$, $l_{EWR\_RW}$, and $l_{AARs}$ are the losses calculated from each CNN branch 260, 262, 264, 266, as shown in FIG. 2.

Figure 3:
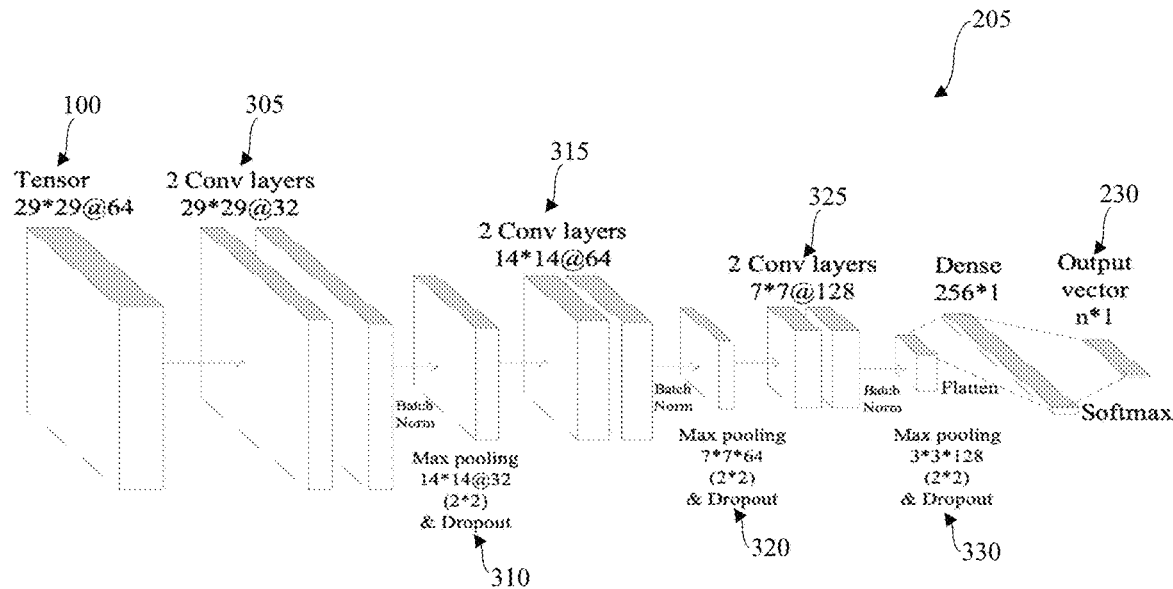
FIG. 3 is an illustration of a proposed runway configuration Convolutional Neural Network (CNN) branch, in accordance with an embodiment of the present invention.

Referring to FIG. 3, the runway configuration CNN branches 205, 210, 220, 225 take in the 3-D input tensor 100 and feed it into a two-layer CNN 305 with a kernel size of 3×3 and using ReLU activation function $f(z) = \max(0, z)$. The convoluted outputs are then normalized and filtered through a max pooling layer 310 with dropout rate 0.3. Finally, two more double convolutional layers 315, 325 are applied followed by max pooling and dropout layers 320, 330. The output 230 of this branch is a n×1 vector, where n is the number of runway configurations.

Figure 4:
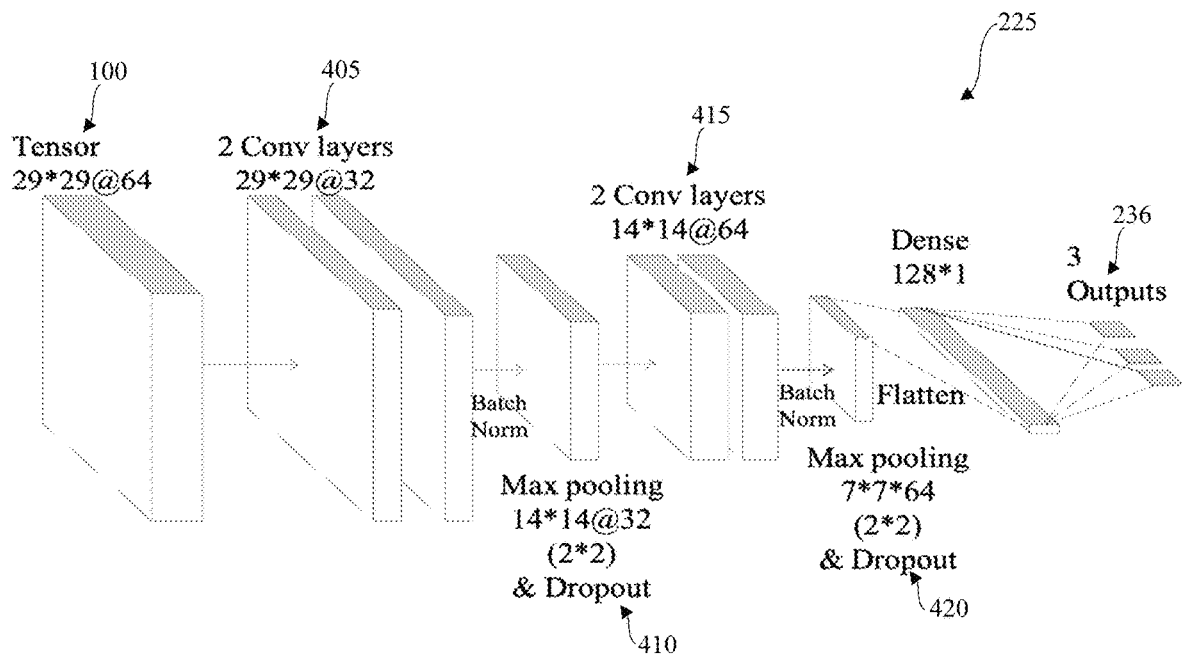
FIG. 4. is an illustration of a proposed AARs CNN branch, in accordance with an embodiment of the present invention.

FIG. 4 shows the AAR model branch 225 with only two double convolutional layers 405, 415 and two max pooling layers 410, 420. The hyperparameters used in this branch are the same as those in runway configuration branches. The output 236 is an AAR for each of the three airports in the exemplary multi-airport embodiment.

The present invention may be embodied on various computing platforms that perform actions responsive to software-based instructions. Instructions stored on a computer readable medium may be utilized to enable the invention. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++ or the like and conventional procedural programming languages, such as the "C" programming language or similar programming languages.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A computer-implemented method for simultaneously predicting runway configurations and airport acceptance rates (AARs) for a multi-airport system, the method comprising:

obtaining archived numerical weather forecast data during a time period of interest for the multi-airport system;

generating archived three-dimensional (3-D) tensor data from the archived numerical weather forecast data for the time period of interest;

training each of a plurality of runway configuration convolutional neural network (CNN) branches to predict an hourly runway configuration for each of a plurality of airports of the multi-airport system using the archived 3-D tensor data as input;

training an airport acceptance rate (AAR) branch to predict an AAR for each of the plurality of airports of the multi-airport system using the archived 3-D tensor data as input;

obtaining real-time numerical weather forecast data for the multi-airport system;

generating real-time 3-D tensor data from the real-time numerical weather forecast data;

predicting a real-time hourly runway configuration for each of the plurality of airports of the multi-airport system using the real-time 3-D tensor data as input to the plurality of trained runway configuration CNN branches;

predicting a real-time AAR for each of the plurality of airports of the multi-airport system using the real-time 3-D tensor data as input to the trained AAR CNN branch; and providing the predicted real-time hourly runway configuration and the predicted real-time AAR for each of the plurality of airports as input to an air traffic decision making unit to control a plurality of flights arriving at and departing from one or more of the plurality of airports of the multi-airport system for the time period of interest.

2. The method of claim 1, wherein the archived numerical weather forecast data and the real-time numerical weather forecast data includes radar data, surface observation data and satellite data.

3. The method of claim 1, wherein the archived numerical weather forecast data and the real-time numerical weather forecast data is Rapid Refresh (RAP) data.

4. The method of claim 1, wherein the multi-airport system is within a grid of interest and wherein the archived 3-D tensor data and the real-time 3-D tensor data comprises latitude, longitude, and weather-forecast elements for the grid of interest.

5. The method of claim 4, wherein the weather-forecast elements include a plurality of surface variables and a plurality of aloft variables.

6. The method of claim 4 further comprising, normalizing the weather-forecast elements for the grid of interest prior to providing the archived 3-D tensor data to the runway configuration CNN branches and the AAR CNN branch.

7. The method of claim 1, wherein predicting real-time hourly runway configurations for each of the plurality of airports of the multi-airport system using the real-time 3-D tensor data as input to a plurality of runway configuration CNN branches further comprises, for each of the runway configuration CNN branches:

processing the real-time 3-D tensor data through three double convolutional layers; and processing the real-time 3-D tensor data through a max pooling layer and a dropout layer between the processing of the real-time 3-D tensor data through each of the three double convolutional layers.

8. The method of claim 1, wherein predicting the real-time AAR for each of the plurality of airports of the multi-airport system using the real-time 3-D tensor data as input to the AAR CNN branch further comprises:

processing the real-time 3-D tensor data through two double convolutional layers; and processing the real-time 3-D tensor data through a max pooling layer and a dropout layer between the processing of the real-time 3-D tensor data through each of the two double convolutional layers.

9. A system, including a processor, memory, display, air traffic management device and input device for managing flights within a multi-airport system simultaneously by predicting runway configurations and airport acceptance rates (AARs) for a multi-airport system, the system comprising:

an input device for obtaining archived Rapid Refresh (RAP) data during a time period of interest for the multi-airport system, wherein the multi-airport system is within a grid of interest;

a processor for generating archived three-dimensional (3-D) tensor data from the archived RAP data for the time period of interest, wherein the archived 3-D tensor data comprises latitude, longitude, and weather-forecast elements for the grid of interest;

the processor for training each of a plurality of runway configuration convolutional neural network (CNN) branches to predict an hourly runway configuration for each of a plurality of airports of the multi-airport system using the archived 3-D tensor data as input;

the processor for training an airport acceptance rate (AAR) branch to predict an AAR for each of the plurality of airports of the multi-airport system using the archived 3-D tensor data as input;

the input device for obtaining real-time RAP forecast data for the multi-airport system;

the processor for generating real-time 3-D tensor data from the real-time RAP forecast data;

the processor for predicting a real-time hourly runway configuration for each of the plurality of airports of the multi-airport system using the real-time 3-D tensor data as input to the plurality of trained runway CNN branches;

the processor for predicting a real-time AAR for each of the plurality of airports of the multi-airport system using the real-time 3-D tensor data as input to the trained AAR CNN branch; and an air traffic decision making unit to receive as input the predicted real-time hourly runway configuration and the predicted real-time AAR for each of the plurality of airports, the air traffic decision making unit to control a plurality of flights arriving at and departing from one or more of the plurality of airports of the multi-airport system for the time period of interest.

10. The system of claim 9, wherein the weather-forecast elements include a plurality of surface variables and a plurality of aloft variables.

11. The system of claim 9 further comprising, normalizing the weather-forecast elements for the grid of interest prior to providing the archived 3-D tensor data to the plurality of runway configuration CNN branches and the AAR CNN branch.

12. One or more non-transitory computer-readable media having computer-executable instructions for performing a method of running a software program on a computing device, the computing device operating under an operating system, the method including issuing instructions from the software program for simultaneously predicting runway configurations and airport acceptance rates (AARs) for a multi-airport system comprising:

obtaining archived numerical weather forecast data during a time period of interest for the multi-airport system;

generating archived three-dimensional (3-D) tensor data from the archived numerical weather forecast data for the time period of interest;

training each of a plurality of runway configuration convolutional neural network (CNN) branches to predict an hourly runway configuration for each of a plurality of airports of the multi-airport system using the archived 3-D tensor data as input;

training an airport acceptance rate (AAR) branch to predict an AAR for each of the plurality of airports of the multi-airport system using the archived 3-D tensor data as input;

obtaining real-time numerical weather forecast data for the multi-airport system;

generating real-time 3-D tensor data from the real-time numerical weather forecast data;

predicting a real-time hourly runway configuration for each of the plurality of airports of the multi-airport system using the real-time 3-D tensor data as input to the plurality of trained runway configuration CNN branches;

predicting a real-time AAR for each of the plurality of airports of the multi-airport system using the real-time 3-D tensor data as input to the trained AAR CNN branch; and providing the predicted real-time hourly runway configuration and the predicted real-time AAR for each of the plurality of airports as input to an air traffic decision making unit to control a plurality of flights arriving at and departing from one or more of the plurality of airports of the multi-airport system for the time period of interest.

13. The media of claim 12, wherein the archived numerical weather forecast data and the real-time numerical weather forecast data includes radar data, surface observation data and satellite data.

14. The media of claim 12, wherein the archived numerical weather forecast data and the real-time numerical weather forecast data is Rapid Refresh (RAP) data.

15. The media of claim 12, wherein the multi-airport system is within a grid of interest and wherein the archived 3-D tensor data and the real-time 3-D tensor data comprises latitude, longitude, and weather-forecast elements for the grid of interest.

16. The media of claim 15, wherein the weather-forecast elements include a plurality of surface variables and a plurality of aloft variables.

17. The media of claim 15 further comprising, normalizing the weather-forecast elements for the grid of interest prior to providing the archived 3-D tensor data to the plurality of runway configuration CNN branches and the AAR CNN branch.

18. The media of claim 12, wherein predicting real-time hourly runway configurations for each of the plurality of airports of the multi-airport system using the real-time 3-D tensor data as input to a plurality of runway configuration CNN branches further comprises, for each of the runway configuration CNN branches:

processing the real-time 3-D tensor data through three double convolutional layers; and processing the real-time 3-D tensor data through a max pooling layer and a dropout layer between the processing of the real-time 3-D tensor data through each of the three double convolutional layers.

19. The media of claim 12, wherein predicting the real-time AAR for each of the plurality of airports of the multi-airport system using the real-time 3-D tensor data as input to the AAR CNN branch further comprises:

processing the real-time 3-D tensor data through two double convolutional layers; and processing the real-time 3-D tensor data through a max pooling layer and a dropout layer between the processing of the real-time 3-D tensor data through each of the two double convolutional layers.

\* \* \* \* \*